United States Patent
Rohrmueller et al.

(10) Patent No.: US 12,460,566 B2
(45) Date of Patent: Nov. 4, 2025

(54) DOSING MODULE FOR USE IN AFTERTREATMENT SYSTEMS FOR INTERNAL COMBUSTION ENGINES

(71) Applicant: Cummins Emission Solutions Inc., Columbus, IN (US)

(72) Inventors: Ralf Rohrmueller, Faulbach (DE); Thomas Kreser, Lohr (DE); Christian Geiss, Grossostheim (DE); Jonas Hofmann, Esselbach (DE); Jakob Stang, Marktheidenfeld (DE); Friedrich Johann Zapf, Karlstadt (DE); Harald Breitenbach, Marktheidenfeld (DE)

(73) Assignee: Cummins Emission Solutions Inc., Columbus, IN (US)

( * ) Notice: Subject to any disclaimer, the term of this patent is extended or adjusted under 35 U.S.C. 154(b) by 11 days.

(21) Appl. No.: 18/765,844

(22) Filed: Jul. 8, 2024

(65) Prior Publication Data
US 2024/0360780 A1    Oct. 31, 2024

Related U.S. Application Data

(63) Continuation of application No. 16/604,483, filed as application No. PCT/US2017/027401 on Apr. 13, 2017, now Pat. No. 12,060,822.

(51) Int. Cl.
*F01N 3/02*     (2006.01)
*F01N 3/10*     (2006.01)
(Continued)

(52) U.S. Cl.
CPC ............... *F01N 3/208* (2013.01); *F01N 9/00* (2013.01); *F01N 3/021* (2013.01); *F01N 3/106* (2013.01);
(Continued)

(58) Field of Classification Search
CPC .......... F01N 3/021; F01N 3/103; F01N 3/106; F01N 3/20; F01N 3/206; F01N 3/2073;
(Continued)

(56) References Cited

U.S. PATENT DOCUMENTS

| | | |
|---|---|---|
| 5,346,136 A | 9/1994 | Bassett |
| 6,192,677 B1 | 2/2001 | Tost |

(Continued)

FOREIGN PATENT DOCUMENTS

| | | |
|---|---|---|
| BR | 112012014920-2 B1 | 1/1900 |
| BR | 112012014923-7 B1 | 1/1900 |

(Continued)

OTHER PUBLICATIONS

Office Action in Brazilian Patent Application No. BR 112019021375-9, issued Apr. 25, 2024.

(Continued)

*Primary Examiner* — Dapinder Singh
(74) *Attorney, Agent, or Firm* — Foley & Lardner LLP

(57) ABSTRACT

A dosing module for an aftertreatment system includes: a housing; a dosing cartridge removably inserted in the housing, the dosing cartridge including a needle assembly; a cover coupled to the housing, the cover covering the dosing cartridge; an inlet port inserted in the housing, the inlet port configured to receive reductant and provide the reductant to the dosing cartridge; and a filter screw coupled to the inlet port such that the filter screw is interchangeable, the filter screw including a pin, the filter screw being compressible to provide compensation for fluid expansion.

19 Claims, 9 Drawing Sheets

(51) Int. Cl.
*F01N 3/20* (2006.01)
*F01N 9/00* (2006.01)
*F01N 3/021* (2006.01)

(52) U.S. Cl.
CPC .... *F01N 2340/06* (2013.01); *F01N 2570/145* (2013.01); *F01N 2610/02* (2013.01); *F01N 2610/146* (2013.01); *F01N 2900/1806* (2013.01)

(58) Field of Classification Search
CPC .......... F01N 3/208; F01N 9/00; F01N 13/008; F01N 13/009; F01N 13/0093; F01N 2240/25; F01N 2260/20; F01N 2340/06; F01N 2570/145; F01N 2610/02; F01N 2610/1406; F01N 2610/1453; F01N 2610/146; F01N 2900/1806; F01N 2900/1821; Y02A 50/20; Y02T 10/12; Y02T 10/40
See application file for complete search history.

(56) References Cited

U.S. PATENT DOCUMENTS

| | | | |
|---|---|---|---|
| 6,273,120 B1 | 8/2001 | Hofmann et al. | |
| 6,279,603 B1 | 8/2001 | Czarnik et al. | |
| 7,043,350 B2* | 5/2006 | Abe | F02D 41/3005 701/104 |
| 7,882,697 B2* | 2/2011 | Ichikawa | B01D 53/90 60/303 |
| 8,033,099 B2* | 10/2011 | Ohshima | F01N 3/2066 239/596 |
| 8,109,077 B2 | 2/2012 | Reba et al. | |
| 8,549,842 B2* | 10/2013 | Park | F01N 3/2066 60/303 |
| 8,635,854 B2 | 1/2014 | Shovels et al. | |
| 9,120,072 B2* | 9/2015 | Tsukada | B01J 19/0046 |
| 9,381,466 B2 | 7/2016 | Kim et al. | |
| 9,435,243 B2* | 9/2016 | Knittel | F01N 11/00 |
| 9,441,520 B2 | 9/2016 | Henry et al. | |
| 9,598,994 B2* | 3/2017 | Winkler | F01N 3/2066 |
| 11,174,773 B2* | 11/2021 | DeVito | F01N 3/208 |
| 2004/0118109 A1 | 6/2004 | Gladden | |
| 2007/0228191 A1 | 10/2007 | Harmon et al. | |
| 2010/0319324 A1 | 12/2010 | Mital | |
| 2011/0192140 A1* | 8/2011 | Olivier | F01N 3/20 60/303 |
| 2011/0197569 A1 | 8/2011 | Salanta et al. | |
| 2013/0228231 A1 | 9/2013 | Nagel et al. | |
| 2013/0292498 A1 | 11/2013 | Olivier et al. | |
| 2013/0343959 A1 | 12/2013 | Golin et al. | |
| 2014/0054394 A1* | 2/2014 | Bugos | F01N 3/10 239/132.3 |
| 2014/0238534 A1 | 8/2014 | Bartlett et al. | |
| 2014/0360168 A1 | 12/2014 | Broderick et al. | |
| 2015/0167526 A1 | 6/2015 | Henry et al. | |
| 2015/0176463 A1 | 6/2015 | Olivier et al. | |
| 2015/0196878 A1 | 7/2015 | Nunez et al. | |
| 2015/0361857 A1 | 12/2015 | Matsuo et al. | |
| 2016/0084129 A1 | 3/2016 | Mcfarland et al. | |
| 2016/0305298 A1* | 10/2016 | Murst | F01N 3/2066 |
| 2019/0170037 A1* | 6/2019 | Caulkins | F01N 3/208 |
| 2020/0191088 A1* | 6/2020 | Steininger | F02M 57/005 |

FOREIGN PATENT DOCUMENTS

| | | |
|---|---|---|
| DE | 10 2014 201 816 A1 | 6/2015 |
| GB | 2 017 16190 | 11/2017 |
| JP | 2001-152831 A | 6/2001 |
| JP | 2008-031996 A | 2/2008 |
| JP | 2012-122469 A | 6/2012 |
| WO | WO-2014/014399 A1 | 1/2014 |

OTHER PUBLICATIONS

Examination Report in UK Patent Application No. GB 1914700.8, issued Jul. 20, 2021.
Examination Report in UK Patent Application No. GB 1914700.8, issued Sep. 16, 2021.
Office Action in Indian Patent Application No. IN 201947044107, issued Mar. 24, 2021.
Office Action in Chinese Patent Application No. 202110281919.2, issued Mar. 16, 2022.
International Search Report and Written Opinion in PCT/US2017/027401, issued Aug. 16, 2017.

* cited by examiner

DOSING MODULE FOR USE IN AFTERTREATMENT SYSTEMS FOR INTERNAL COMBUSTION ENGINES

CROSS-REFERENCE TO RELATED APPLICATIONS

The present application is a continuation of U.S. patent application Ser. No. 16/604,483, filed Oct. 10, 2019, which is a National Stage of PCT Application No. PCT/US2017/027401, filed Apr. 13, 2017. The entire contents of these applications are hereby incorporated by reference.

TECHNICAL FIELD

The present application relates generally to the field of dosing modules for use in aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, diesel exhaust fluid (DEF), or aqueous urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system. The SCR system may include one or more sensors to monitor conditions within the exhaust system.

SUMMARY

In an embodiment, an aftertreatment system includes an inlet exhaust section, an outlet exhaust section, a first aftertreatment component, a first dosing module, and a second dosing module. The inlet exhaust section receives exhaust. The outlet exhaust section is in fluid communication with the inlet exhaust section. The first aftertreatment component receives the exhaust from the inlet exhaust section, treats the exhaust, and provides the exhaust to the outlet exhaust section. The first dosing module is positioned along the inlet exhaust section. The first dosing module is structured to selectively dose the exhaust with reductant. The second dosing module is positioned along the outlet exhaust section. The second dosing module is structured to selectively dose the exhaust with the reductant.

In another embodiment, a dosing module for an aftertreatment system includes a housing, a dosing cartridge, an inlet port, an outlet port, and a cover. The housing mounts to a structure. The dosing cartridge is inserted within the housing. The dosing cartridge includes a needle assembly. The inlet port is inserted within the housing. The inlet port receives reductant and provides the reductant to the dosing cartridge. The outlet port is inserted within the housing. The outlet port receives the reductant from the dosing cartridge and provides the reductant from the dosing module. The cover is coupled to the housing. The cover covers the dosing cartridge. The dosing cartridge and the housing are structured such that the reductant is capable of flowing within an interstice between the dosing cartridge and the housing. The dosing module is controlled between an operation mode and a non-operation mode. The dosing module, in the operation mode, selectively causes the needle assembly to dose reductant from the dosing module.

In still another embodiment, aftertreatment system includes an inlet exhaust section, an outlet exhaust section, a first aftertreatment component, and a first dosing module. The inlet exhaust section receives exhaust. The outlet exhaust section is in fluid communication with the inlet exhaust section. The first aftertreatment component receives the exhaust from the inlet exhaust section, treats the exhaust, and provides the exhaust to the outlet exhaust section. The first dosing module is positioned along the inlet exhaust section. The first dosing module is structured to selectively dose the exhaust with reductant. The first dosing module includes a housing, a dosing cartridge, an inlet port, and an outlet port. The housing mounts to a structure. The dosing cartridge is inserted within the housing. The dosing cartridge includes a needle assembly. The inlet port is inserted within the housing. The inlet port receives reductant and provides the reductant to the dosing cartridge. The outlet port is inserted within the housing. The outlet port receives the reductant from the dosing cartridge and provides the reductant from the first dosing module. The dosing cartridge and housing are structured such that reductant is capable of flowing within an interstice between the dosing cartridge and the housing. The first dosing module is modular such that the dosing cartridge is replaceable, separate from the housing, with a second dosing cartridge.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
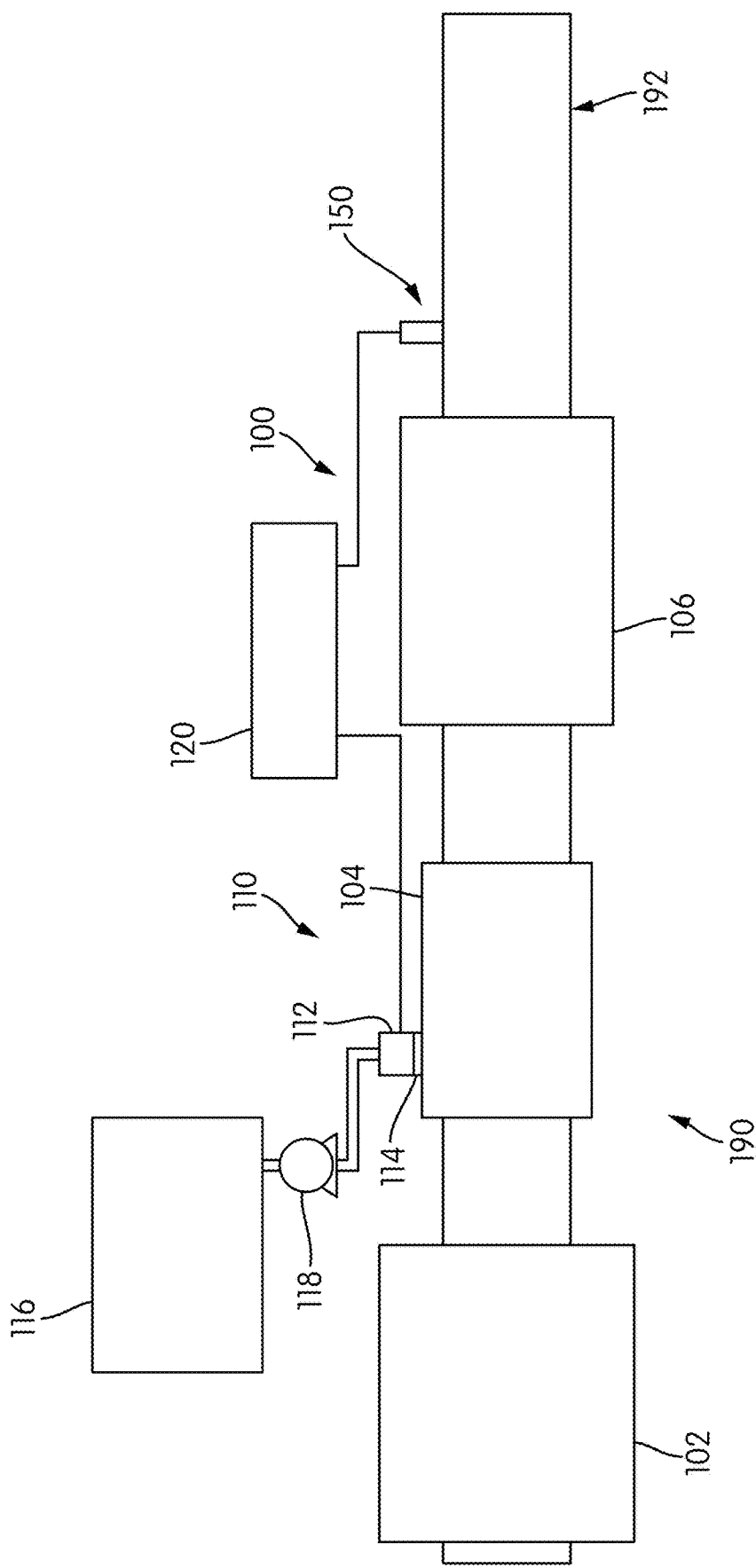
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for dosing exhaust using a doser that is upstream of an aftertreatment component within an aftertreatment system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated by a doser within an aftertreatment system. Conventional dosers are located at a downstream location (e.g., downstream of an aftertreatment component, etc.) within the aftertreatment system such that the dosers are provided with relatively low temperature exhaust.

It is desirable to dose the exhaust at higher temperatures than is currently possible with conventional dosers. By dosing the exhaust at higher temperatures, more desirable operation of the internal combustion engine may be achieved. For example, lower emissions of undesirable compounds (e.g., $NO_x$, etc.) by the internal combustion engine may be achieved by dosing the exhaust at relatively higher temperatures. Further, dosing the exhaust at higher temperatures may allow a doser to utilize less fluid (e.g., reductant, etc.) than conventional dosers.

Implementations described herein relate to a doser that is capable of dosing exhaust at higher temperatures than is currently possible with conventional dosers. For example, implementations described herein relate to a doser that is incorporated at a location within an exhaust system that is upstream of various aftertreatment components. Some of the implementations described herein relate to a multi-doser system that includes two dosers where one doser is capable of dosing the exhaust at relatively higher temperatures and the other doser is structured to dose the exhaust at relatively lower temperatures. Implementations described herein may facilitate post-turbocharger dosing, which is not currently possible using conventional dosers. In this way, an exhaust system may be capable of handling higher temperatures. These higher temperatures may occur in various applications, such as off-road applications.

In some implementations described herein, the doser is modular and facilitates selective upgrading, replacement, and/or service of components (e.g., dosing cartridge, housing, filters, etc.) therein. The modular design of the doser in these implementations facilitates the flow of fluid around the dosing cartridge, thereby providing enhanced cooling of the dosing cartridge and inhabiting heat transfer to the dosing cartridge. Further, the modular design of the doser in these implementations may inhabit the transfer of vibrations and other noises to the dosing cartridge.

II. Overview of Aftertreatment System

FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a decomposition chamber 104 (e.g., reactor, reactor pipe, etc.), a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide. In some implementations, the DPF 102 may be omitted.

The decomposition chamber 104 is configured to convert a reductant, such as urea or diesel exhaust fluid (DEF), into ammonia. The decomposition chamber 104 includes a reductant delivery system 110 having a doser or dosing module 112 configured to dose the reductant into the decomposition chamber 104 (for example, via an injector such as the injector described below). In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 on which the dosing module 112 is mounted. The dosing module 112 is fluidly coupled to one or more reductant source 116. The reductant source 116 may include multiple reductant sources 116. In some implementations, a pump 118 may be used to pressurize the reductant from the reductant source 116 for delivery to the dosing module 112. In some embodiments, the pump 118 is pressure controlled (e.g., controlled to obtain a target pressure, etc.). The reductant source 116 may be, for example, a diesel exhaust fluid tank containing Adblue®.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory, which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes an inlet in fluid communication with the decomposition chamber 104 from which exhaust gas and reductant are received and an outlet in fluid communication with an end of the exhaust system 190.

The exhaust system 190 may further include an oxidation catalyst (for example, a diesel oxidation catalyst (DOC)) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber 104. For instance, the DPF 102 and the SCR catalyst 106 may be combined into a single unit. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190; for example, a tip of the sensor 150 may extend into a portion of the exhaust system 190. In other implementations, the sensor 150 may receive exhaust gas through another conduit, such as one or more sample pipes extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the aforementioned positions of the exhaust system 190.

III. Example Aftertreatment System Including an Auxiliary Dosing Module

Figure 2:
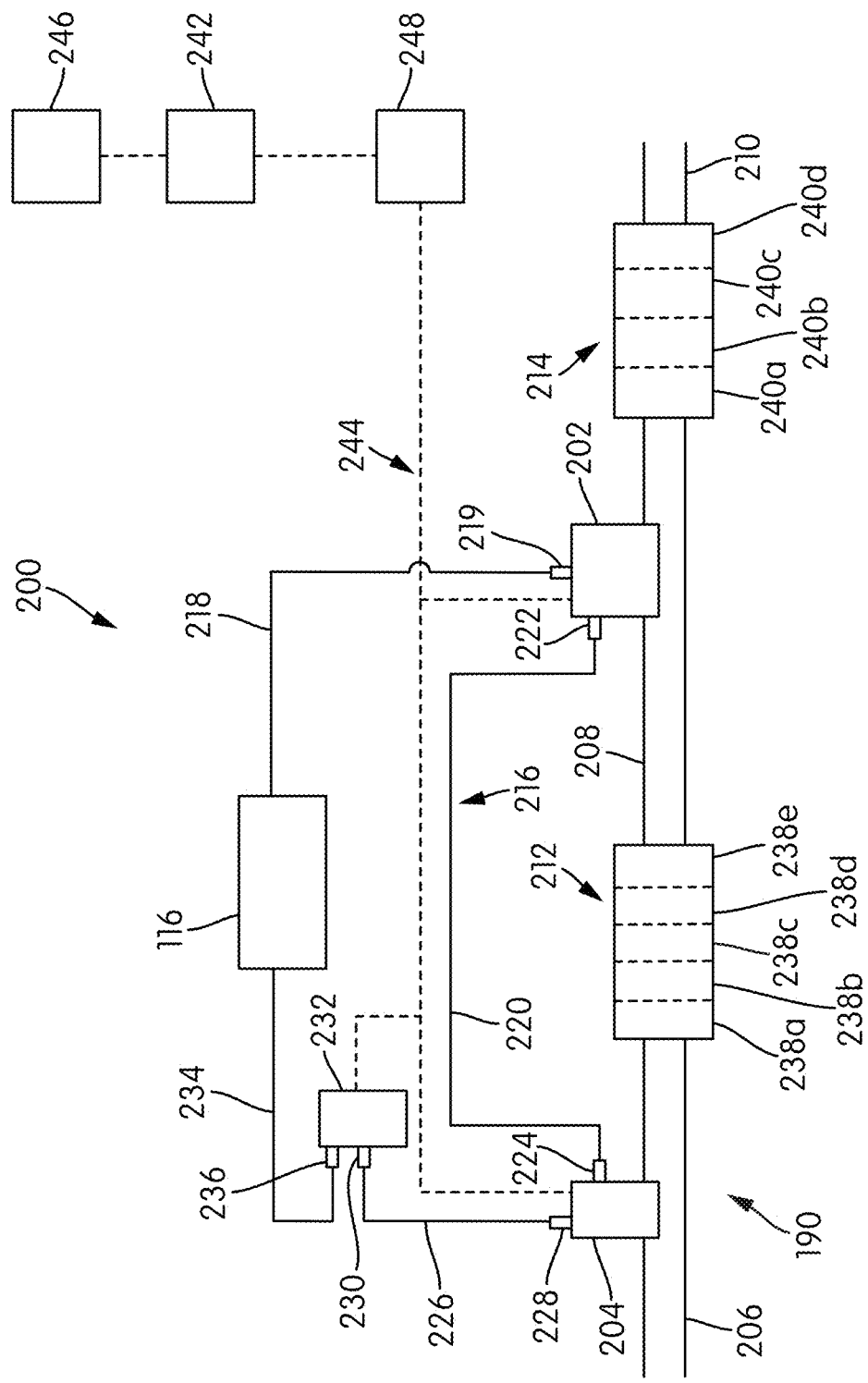
FIG. 2 is a block schematic diagram of an example aftertreatment system having an example auxiliary doser.

FIG. 2 depicts an aftertreatment system 200 that includes a dosing module 202 and an auxiliary (second) dosing module 204. The dosing module 202 may function as the dosing module 112 previously described. Prior to entering the auxiliary dosing module 204, the flow of fluid may be regulated by a valve (e.g., a restriction valve, etc.), an orifice, or other similar structure. Alternative, the flow of fluid is controlled by a component of the aftertreatment system 100 that is downstream of the auxiliary dosing module 204. According to an exemplary embodiment, the auxiliary dosing module 204 is configured to operate at relatively high temperatures (e.g., one-hundred and sixty degrees Celsius, two-hundred degrees Celsius, etc.) without the use of an additional active cooling system as is required in conventional dosing modules that are exposed to similar temperatures. Cooling of the auxiliary dosing module 204 is achieved through recirculation of fluid (e.g., permanent recirculation, constant recirculation, etc.) within the auxiliary dosing module 204.

The aftertreatment system 200 includes the exhaust system 190 which includes an inlet exhaust section 206, a connecting exhaust section 208 which is in fluid communication with the inlet exhaust section 206, and an outlet exhaust section 210 which is in fluid communication with the connecting exhaust section 208. The inlet exhaust section 206 receives exhaust from an internal combustion engine (e.g., via an exhaust manifold, etc.). In various embodiments, the auxiliary dosing module 204 receives exhaust directly from a turbocharger via the inlet exhaust section 206. In this way, the auxiliary dosing module 204 receives exhaust that has a relatively high temperature. The outlet exhaust section 210 provides the exhaust from the internal combustion engine downstream, such as to a tailpipe, a muffler, or other similar structure.

The aftertreatment system 200 also includes a first aftertreatment component 212 and a second aftertreatment component 214. The first aftertreatment component 212 is positioned between the inlet exhaust section 206 and the connecting exhaust section 208. Similarly, the second aftertreatment component 214 is positioned between the connecting exhaust section 208 and the outlet exhaust section 210. According to various embodiments, the first aftertreatment component 212 and the second aftertreatment component 214 are configured to cooperatively treat the exhaust received from the internal combustion engine such that emissions produced by the exhaust system 190 are more desirable. For example, the first aftertreatment component 212 and the second aftertreatment component 214 may reduce the level of $NO_x$ in the exhaust. In this way, a system (e.g., a vehicle, a generator, a maritime vessel, etc.) utilizing an internal combustion engine having the aftertreatment system 200 may be more desirable than similar systems without the aftertreatment system 200.

As shown in FIG. 2, the dosing module 202 is disposed along the connecting exhaust conduit 208, and the auxiliary dosing module 204 is disposed along the inlet exhaust section 206. Each of the dosing module 202 and the auxiliary dosing module 204 are configured to selectively dose (e.g., treat, etc.) the exhaust. By dosing the exhaust, the dosing module 202 and the auxiliary dosing module 204 cooperate with the first aftertreatment component 212 and the second aftertreatment component 214 in treating the exhaust as previously described. The auxiliary dosing module 204 doses an amount of fluid into the exhaust system 190. For example, the auxiliary dosing module 204 may dose an amount of fluid that is regulated by pressure, nozzle type, and valve opening time. The auxiliary dosing module 204 may be utilized as a single doser (e.g., without the dosing module 202, etc.) or in a multi-doser configuration (e.g., with the dosing module 202, with the dosing module 202 and a third doser, etc.).

The dosing module 202 and the auxiliary dosing module 204 are in fluid communication with a fluid circuit 216. The fluid circuit 216 includes the reductant source 116 as previously described. The fluid circuit 216 also includes a first section 218 which fluidly connects the reductant source 116 and the dosing module 202 through an outlet 219 of the dosing module 202. The fluid circuit 216 further includes a second section 220 which fluidly connects an inlet 222 of the dosing module 202 with an outlet 224 of the auxiliary dosing module 204. The fluid circuit 216 further includes a third section 226 which fluidly connects an inlet 228 of the auxiliary dosing module 204 with an outlet 230 of a supply unit 232. The fluid circuit 216 further includes a fourth section 234 which fluidly connects an inlet 236 of the supply unit 232 with the reductant source 116.

The supply unit 232 functions to draw reductant from the reductant source 116 and provide the reductant to the dosing module 202 and the auxiliary dosing module 204 through the fluid circuit 216. In one embodiment, the supply unit 232 is configured such that the reductant is provided from the reductant source 116 through the fourth section 234, into the inlet 236 of the supply unit 232, out of the outlet 230 of the supply unit 232, through the third section 226, into the inlet 228 of the auxiliary dosing module 204, out of the outlet 224 of the auxiliary dosing module 204, through the second section 220, into the inlet 222 of the dosing module 202, out of the outlet 219 of the dosing module 202, through the first section 218, and into the reductant source 116. In an alternative embodiment, the supply unit 232 is configured such that the reductant is provided from the reductant source 116 through the first section 218, into the outlet 219 of the dosing module 202, out of the inlet 222 of the dosing module 202, through the second section 220, into the outlet 224 of the auxiliary dosing module 204, out of the inlet 228 of the auxiliary dosing module 204, through the third section 226, into the outlet 230 of the supply unit 232, out of the inlet 236 of the supply unit 232, into the fourth section 234, and into the reductant source 116. In this alternative embodiment, the term "outlet" may be interchanged with the term "inlet" and vice versa.

The first aftertreatment component 212 may be divided into a number of sections 238a-238c, and the second aftertreatment component 214 may be divided into a number of sections 240a-240d. In some embodiments, either or both of the first aftertreatment component 212 and the second aftertreatment component 214 may include more or less sections. The section 238a is an inlet of the first aftertreatment component 212, and the section 238e is an outlet of the first aftertreatment component 212. Similarly, the first section 240a is an inlet of the second aftertreatment component 214, and the fourth section 240d is an outlet of the second aftertreatment component 214. Each of the sections 238a-238c of the first aftertreatment component 212 and each of the sections 240a-240d of the second aftertreatment component 214 may include various components and devices to aid in treating of the exhaust. In various applications, each of the sections 238a-238e and the sections 240a-240d may include an SCR, a DOC, a DPF (e.g., the DPF 102, etc.), a slip catalyst (e.g., an ammonia slip catalyst, etc.), and other similar components. In an exemplary embodiment, the second section 238b includes a SCR, the third section 238c includes a DOC, the fourth section 238d includes a DPF, the second section 240b includes a SCR, and the third section 240c includes a slip catalyst.

As shown in FIG. 2, the aftertreatment system 200 also includes an engine control unit 242. The engine control unit 242 is electronically communicable with the dosing module 202, the auxiliary dosing module 204, and the supply unit 232 via a communications network 244. The communications network 244 facilitates transmission of signals between any of the engine control unit 242, the dosing module 202, the auxiliary dosing module 204, and the supply unit 232. For example, the engine control unit 242 may transmit a signal to the dosing module 202 and the auxiliary dosing module 204 that causes the dosing module 202 and/or the auxiliary dosing module 204 to dose the exhaust. The signals transmitted from the engine control unit may include, for example, a dosing amount, a dosing duration, a pumping command (e.g., to the supply unit 232, etc.), and other similar commands.

In some embodiments, the aftertreatment system 200 also includes a parameters unit 246 which is electronically communicable with the communications network 244. The parameters unit 246 may provide information (e.g., stored parameters, sensed parameters, etc.) to the engine control unit 242. For example, the parameters unit 246 may be electronically communicable with various sensors (e.g., the sensor 150, etc.) such that the parameters unit 246 receives information from various components within the aftertreatment system 200. In some applications, the parameters unit 246 receives a level (e.g., amount, percentage of maximum capacity, etc.) of reductant within the reductant source 116, a temperature (e.g., a temperature of the inlet exhaust section 206, a temperature of the auxiliary dosing module 204, a temperature within the first aftertreatment component 212, a temperature of the connecting exhaust section 208, a temperature within the second aftertreatment component 214, a temperature of dosing module 202, a temperature of the outlet exhaust section 210, etc.), a quality of the reductant (e.g., a concentration of the reductant, etc.), a level of a component (e.g., $NO_x$, $NH_3$, etc.), and other similar information. The parameters unit 246 may include a memory and a processing circuit. The parameters unit 246 may include configuration data that is stored on the memory, the configuration data related to a configuration of the aftertreatment system 200 (e.g., what is included in each of the sections 238a-238e and each of the sections 240a-240d, etc.).

The aftertreatment system 200 may also include a dosing control unit 248 which is electronically communicable with the communications network 244. The dosing control unit 248 may provide localized control of the dosing module 202, the auxiliary dosing module 204, and/or the supply unit 232.

According to various embodiments, the auxiliary dosing module 204 is different from the dosing module 202. For example, the auxiliary dosing module 204 may be configured to operate at higher temperature than the dosing module 202. Similarly, the auxiliary dosing module 204 may be configured to dose the exhaust differently than the dosing module 202.

Figure 3:
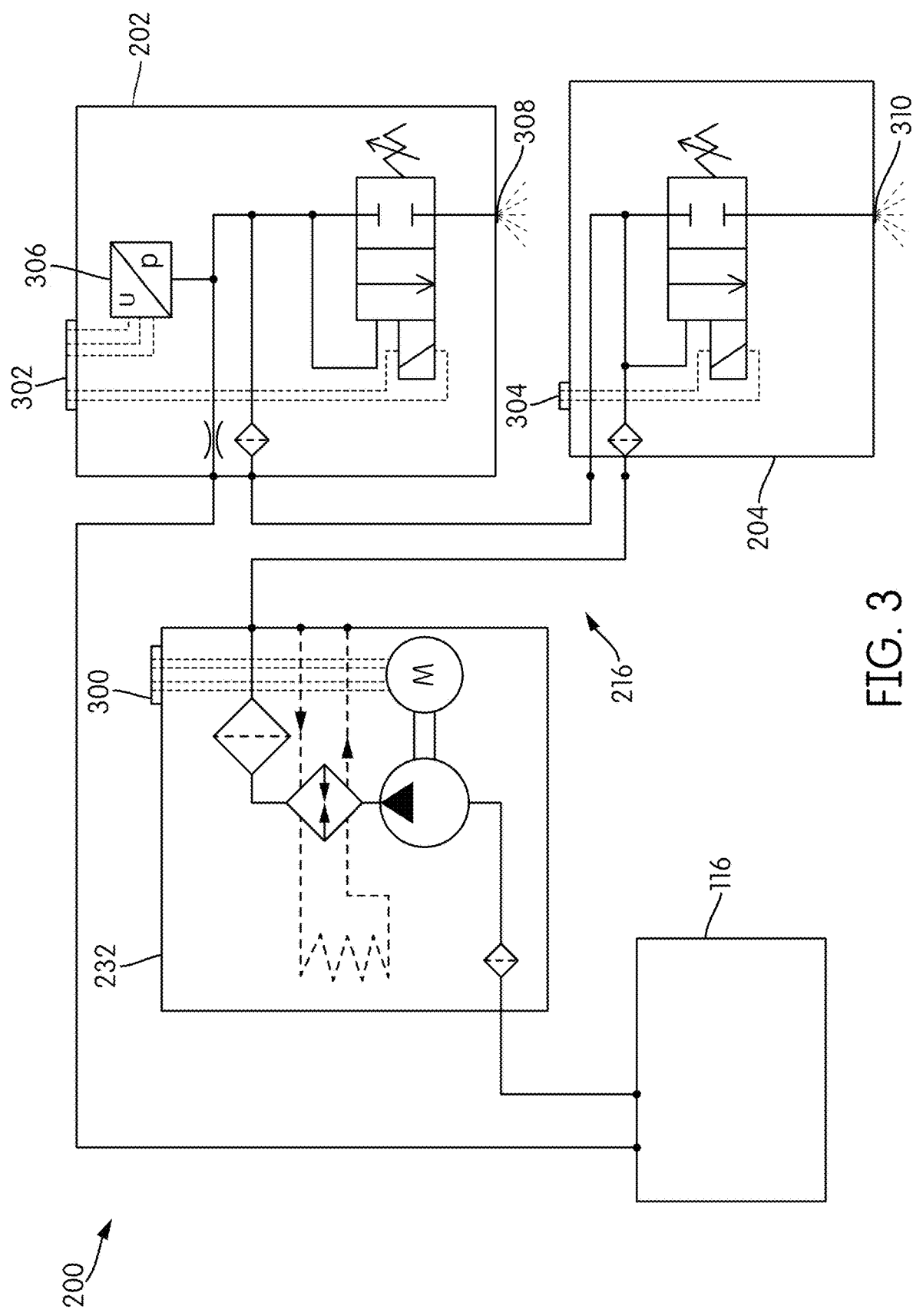
FIG. 3 is a block hydraulic schematic diagram of an example aftertreatment system having an example auxiliary doser.
Figure 4:
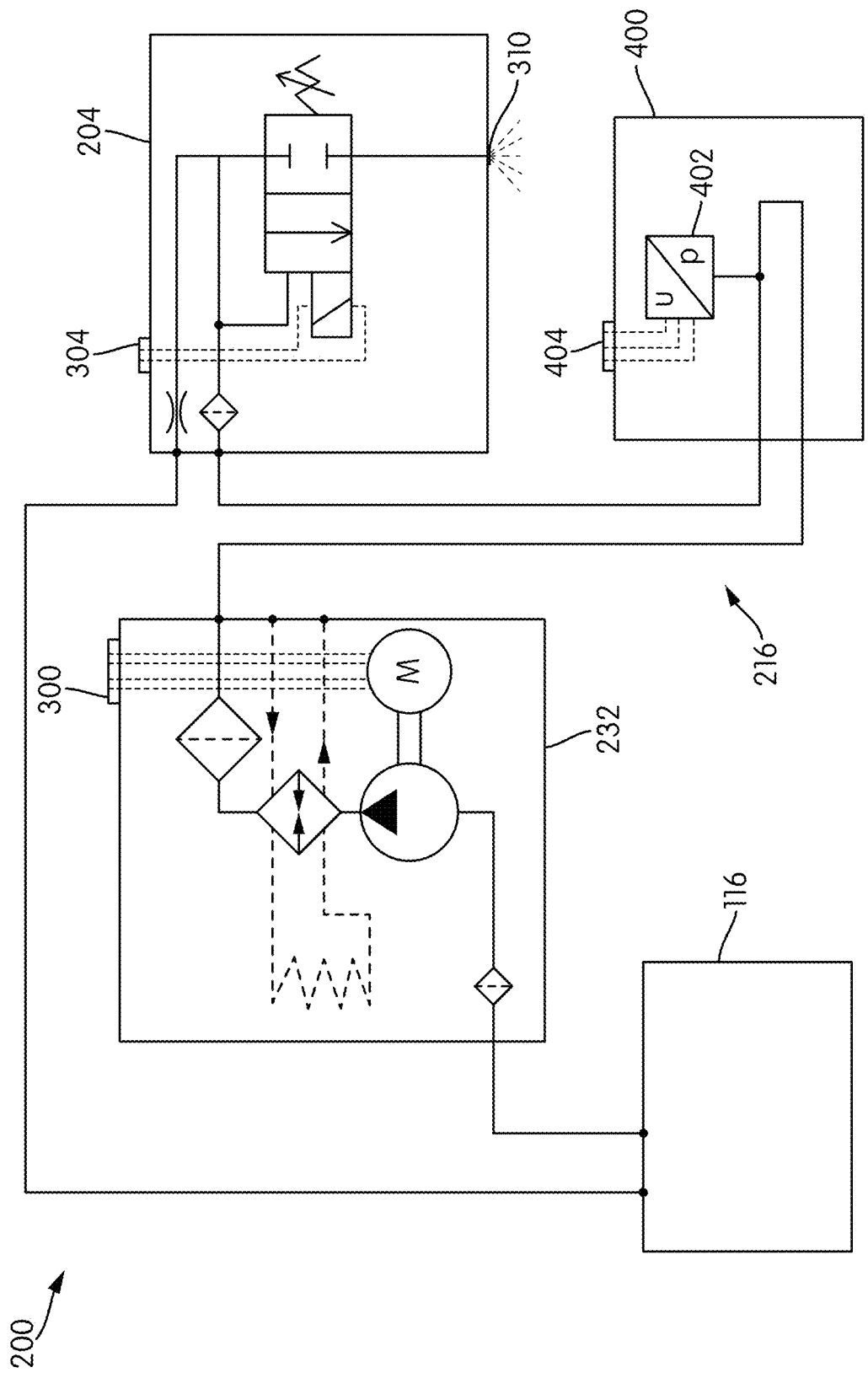
FIG. 4 is another block hydraulic schematic diagram of an example aftertreatment system having an example auxiliary doser.

FIGS. 3 and 4 illustrate hydraulic schematics for the aftertreatment system 200. In FIG. 3, the aftertreatment system 200 is shown to further include a first connector 300, a second connector 302, and a third connector 304. The first connector 300 electrically connects the supply unit 232 to the communications network 244, the second connector 302 electrically connects the dosing module 202 to the communications network 244, and the third connector 304 electrically connects the auxiliary dosing module 204 to the communications network 244. FIG. 3 also shows that the aftertreatment system 200 includes a sensor 306 within the dosing module 202. In some embodiments, the sensor 306 measures a pressure of reductant provided to the dosing module 202. However, in other embodiments, the sensor 306 may additionally or alternatively measure the temperature of the reductant (e.g., through the incorporation of a second sensor, etc.). While not shown in FIG. 3, the auxiliary dosing module 204 may also include a sensor that functions like the sensor 306. In some applications, the dosing module 202 and/or the auxiliary dosing module 204 may include a heater (e.g., a PTC heater, etc.). The heater may heat the reductant prior to dosing the exhaust.

In some embodiments, the dosing module 202 includes a nozzle 308, and the auxiliary dosing module 204 includes a nozzle 310. The nozzle 308 and the nozzle 310 may assist the dosing module 202 and the auxiliary dosing module 204, respectively, in dosing the exhaust. For example, the nozzle 308 and the nozzle 310 may be configured to spray reductant in a desirable pattern or to spray reductant with a desirable droplet size. In some applications, the nozzle 308 and the nozzle 310 are replaceable. In this way, the nozzle 308 and the nozzle 310 may be upgradable, easily serviceable, interchangeable, and removable.

As shown in FIG. 4, the aftertreatment system 200 includes a sensing unit 400 and does not include the dosing module 202. The sensing unit 400 includes a sensor 402 (e.g., a pressure sensor, etc.) and a connector 304, similar to the connectors previously described. The sensing unit 400 can be located in various locations within the aftertreatment system 200 so that a pressure or other parameter of a target location can be measured using the sensor 402. For example, the sensing unit 400 may be located near the inlet exhaust section 206 (e.g., in a located that is at a temperature lower than a temperature of the inlet exhaust section 206, etc.) such that a pressure measurement can be obtained (e.g., through a connecting pipe, etc.), within or located near the auxiliary dosing module 204, within or located near the first aftertreatment component 212, within or located near the connecting exhaust section 208, within or located near the second aftertreatment component 214, within or located near the outlet exhaust section 210, or in other similar locations. In FIG. 4, the aftertreatment system 200 is shown to further include a fourth connector 404. The fourth connector 404 electrically connects the sensing unit 400 to the communications network 244.

Any of the first connector 300, the second connector 302, the third connector 304, and the fourth connector 404 may be, for example, 2-pole connectors, 3-pole connectors, 4-pole connectors, 5-pole connectors, 8-pole connectors, and other similar connectors.

IV. Example Auxiliary Dosing Module

Figure 5:
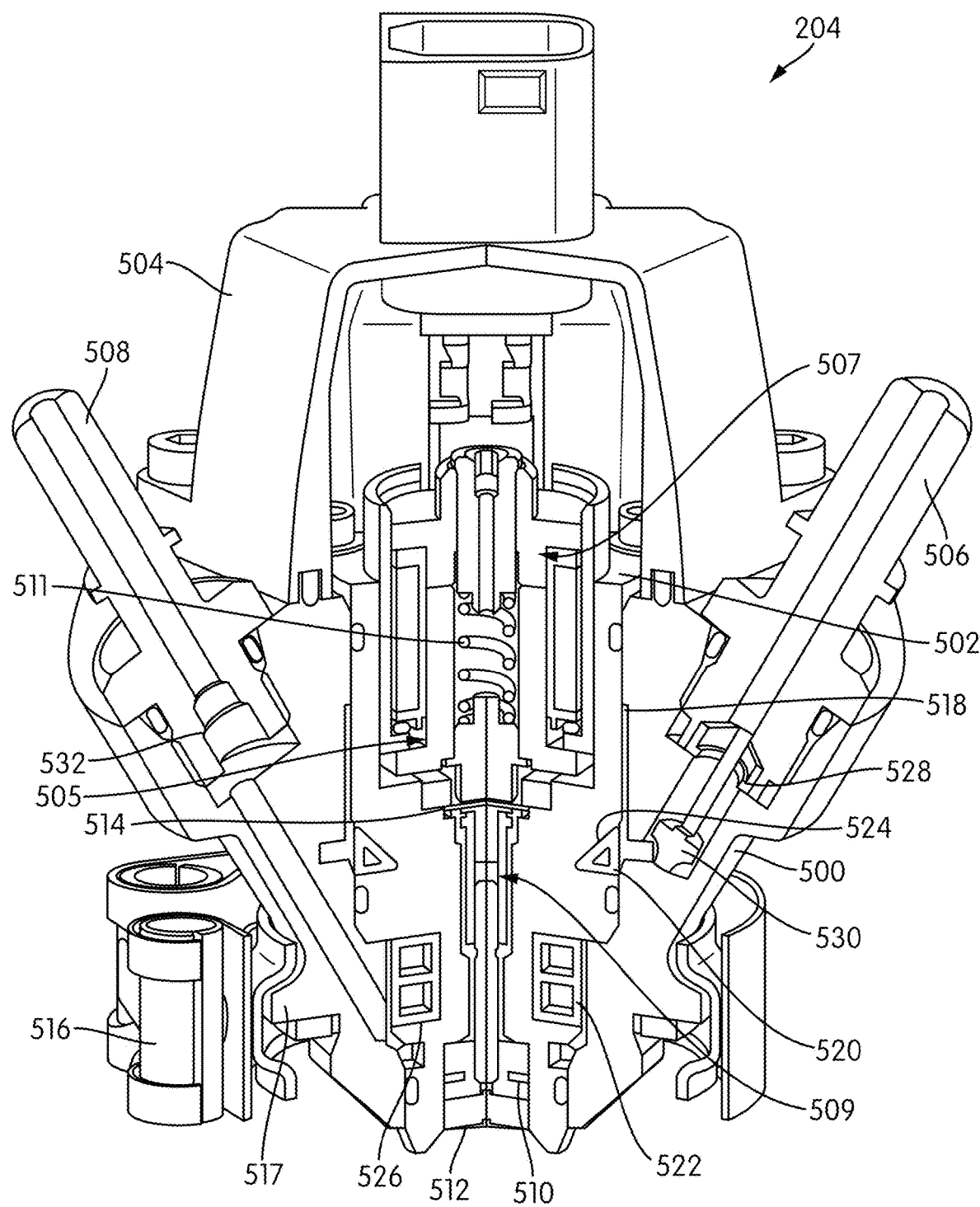
FIG. 5 is a cross-sectional view of an example auxiliary doser.

FIG. 5 illustrates the auxiliary dosing module 204 according to an exemplary embodiment. The auxiliary dosing module 204 includes a housing 500, a dosing cartridge 502, a cover 504, a solenoid assembly 505, a magnet assembly 507, and a needle assembly 509. In some embodiments, the separation of the housing 500 and the dosing cartridge 502 mitigates heat buildup within the dosing cartridge 502. The separation of the housing 500 and the dosing cartridge 502 also facilitates noise and vibration reduction. For example, fluid between the housing 500 and the dosing cartridge 502 may dampen (e.g., reduce, mitigate, etc.) the transfer or noise, temperature, and/or vibration to and from the dosing cartridge 502.

According to various embodiments, the auxiliary dosing module 204 is modular. The dosing cartridge 502 may be utilized with various configurations (e.g., shapes, sizes, configurations, etc.) of the housing 500, and the housing 500 may be utilized with various configurations (e.g., shapes, sizes, configurations, etc.) of the dosing cartridge 502. For example, the dosing cartridge 502 and/or the housing 500 may be replaceable and/or upgradable. In some applications, the auxiliary dosing module 204 may be utilized in one application, a user may desire to utilize the auxiliary dosing module 204 in another application, and the dosing cartridge 502 and/or the housing 500 may be replaced with a different dosing cartridge 502 and/or a different housing 500. In one example, a user may upgrade the dosing cartridge 502 from a dosing cartridge 502 having a first dosing rate to a dosing cartridge 502 having a second dosing rate that is greater than the first dosing rate. Similarly, the auxiliary dosing module 204 may be serviced by replacing the dosing cartridge 502 with a new dosing cartridge 502.

The dosing cartridge 502 is received in the housing 500, and the cover 504 cooperates with the housing 500, to contain the dosing cartridge 502. In some embodiments, the cover 504 is provided via three-dimensional printing or other similar process. The auxiliary dosing module 204 also includes an inlet port 506 and an outlet port 508. The inlet port 506 and the outlet port 508 are received within the housing 500 such that the dosing cartridge 502, the inlet port 506, and the outlet port 508 are in fluid communication. In an exemplary operation, reductant flows from the fluid circuit 216 into the auxiliary dosing module 204 through the inlet port 506 which provides the reductant to the dosing cartridge 502 such that a portion of the reductant may flow through the outlet port 508 back into the fluid circuit 216. The inlet port 506 and the outlet port 508 may be structurally integrated into the housing 500.

The magnet assembly 507 is electrically connected to the cover 504, which is electrically connected to the communications network 244. The magnet assembly 507 and the needle assembly 509 cooperate to selectively dose fluid from the auxiliary dosing module 204. As the fluid is dosed, heat builds up within the solenoid assembly 505. The auxiliary dosing module 204 is configured to circulate fluid within the auxiliary dosing module 204 such that the solenoid assembly 505 within the auxiliary dosing module 204 is cooled. This fluid circulation also impedes heat transfer from an external source into the auxiliary dosing module 204.

The auxiliary dosing module 204 is operable between an operation mode and a non-operation mode. In the non-operation mode, the needle assembly 509 is closed such that fluid is not dosed from the auxiliary dosing module 204 but is instead circulated within the auxiliary dosing module 204. In the operation mode, the magnet assembly 507 causes the needle assembly 509 to lift up against a spring 511, causing fluid to be released from the auxiliary dosing module 204 via a pressurized flow (e.g., swirl flow, hole type flow, etc.).

The dosing cartridge 502 includes a valve seat 510 and a nozzle 512. The valve seat 510 and the nozzle 512 are configured to facilitate injection of the reductant into the exhaust. The valve seat 510 may be integrally cooled (e.g., cooled with reductant, etc.). The nozzle 512 may operate the nozzle 310 previously described. The valve seat 510 and the nozzle 512 may instead be included in the housing 500. The dosing cartridge 502 also includes a valve membrane 514 (e.g., a valve seat, etc.). The valve membrane 514 functions as a sealing element within the dosing cartridge 502. The valve member 514 may be configured to provide an opening force to the auxiliary dosing module 204.

The auxiliary dosing module 204 also includes a clamp 516. The clamp 516 is configured to selectively couple the housing 500 to a structure. According to an exemplary embodiment, the clamp 516 is configured based on the housing 500. For example, the housing 500 may include a lip 517, and the clamp 516 may be configured to couple to the housing 500 over the lip 517. The clamp 516 may be a V-clamp. The clamp 516 may provide both a sealing and a thermal decoupling. In some embodiments, the clamp 516 is a screw and hole connection (e.g., a multiple screw and multiple hole connection, etc.), a bayonet connector (e.g., bayonet mount, bayonet Neill-Concelman connector, etc.), or other similar connection mechanism.

The auxiliary dosing module 204 may be configured such that an interstice 518 is created between the housing 500 and the dosing cartridge 502. In operation, reductant may flow from the inlet port 506 into both the dosing cartridge and the interstice 518. The interstice 518 may become partially or completely filled with the fluid. In this way, the fluid may cool the dosing cartridge 502 (e.g., via conduction through the interstice 518, etc.). In an exemplary embodiment, fluid flows into the dosing cartridge 502 via the interstice 518 (e.g., through an aperture in the dosing cartridge 502, etc.). Fluid may flow through other spaces (e.g., gaps, etc.) between the housing 500 and the dosing cartridge 502 to facilitate cooling of the auxiliary dosing module 204. In these ways, the fluid may provide protection against overheating of the auxiliary dosing module 204 (i.e., in the event of a hot shut down, in the event of fluid flow being shut off, etc.). According to various embodiments, the auxiliary dosing module 204 does not require additional exhaust sealing mechanisms (e.g., exhaust wrap, conduit covers, etc.).

The auxiliary dosing module 204 includes a first expansion element 520 and a second expansion element 522. The first expansion element 520 and the second expansion element 522 are flexible and filled with a compressible medium (e.g., air, gas, foam, etc.). According to various embodiments, the first expansion element 520 and the second expansion element 522 are frost expansion elements (e.g., expansion joints, etc.) such that each of the first expansion element 520 and the second expansion element 522 provides frost compensation. For example, frost expansion of the fluid within the auxiliary dosing module 204 may be captured (e.g., absorbed, etc.) by the first expansion element 520 and/or the second expansion element 522. As the fluid expands due to frost formation, the first expansion element 520 and the second expansion element 522 are compressed. According to various embodiments, the auxiliary dosing module 204 utilizes only the first expansion element 520 and the second expansion element 522 such that the first expansion element 520 and the second expansion element 522 operate independent of other components to compensate for expansion and/or contraction of the fluid within the auxiliary dosing module 204.

The first expansion element 520 is located between the dosing cartridge 502 and the housing 500. Specifically, the first expansion element 520 is disposed within a first channel 524 in the housing 500. According to various embodiments, the first channel 524 is located within the interstice 518 such that fluid from the inlet port 506 flows between the housing 500 and the dosing cartridge 502 into the interstice 518 and contacts the first expansion element 520. As shown in FIG. 5, the first channel 524 may have a triangular profile, and the first expansion element 520 may have a profile that substantially matches the triangular profile of the first channel 524.

The second expansion element 522 is located between the dosing cartridge 502 and the housing 500. Specifically, the second expansion element 522 is disposed within a second channel 526 in the housing 500. According to various embodiments, the second channel 526 is located below the first channel 524 and above the valve seat 510 and the nozzle 512 such that fluid from the inlet port 506 flows between the second expansion element 522 and the housing 500, and out of the valve seat 510 and the nozzle 512. As shown in FIG. 5, the second channel 526 may have a rectangular profile, and the second expansion element 522 may have a profile that substantially matches the rectangular profile of the second channel 526. According to various embodiments, the valve seat 510 includes an integrated cooling path. The integrated cooling path may facilitate transfer of fluid within the dosing cartridge 502.

The auxiliary dosing module 204 also includes a filter 528, a plate 530, and an orifice 532. The filter 528 is configured to filter the fluid from the inlet port 506, thereby protecting the auxiliary dosing module 204 from contamination, prior to the fluid flowing into the dosing cartridge 502. The plate 530 is configured to control the flow of the fluid from the inlet port 506 to the dosing cartridge 502. The orifice 532 is located in the outlet port 508. According to various embodiments, the orifice 532 defines a backflow rate of the auxiliary dosing module 204.

Figure 6:
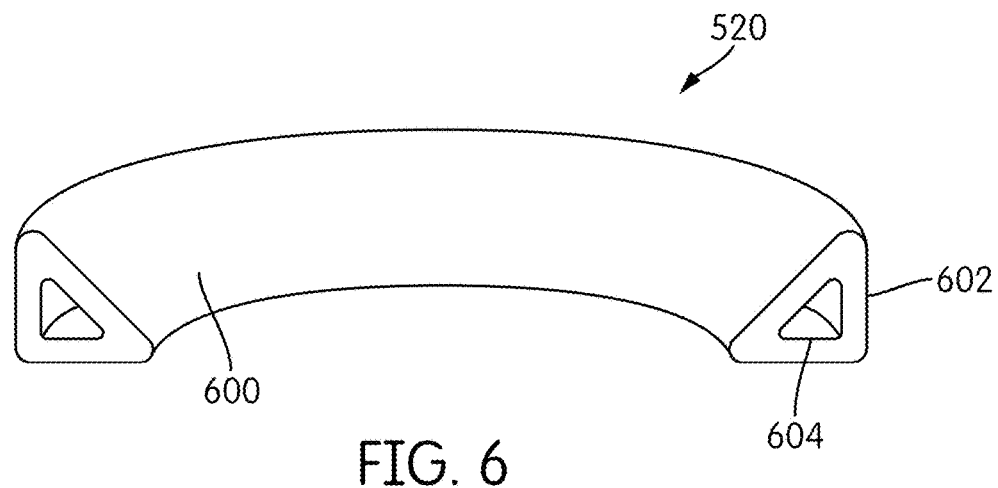
FIG. 6 is a cross-sectional view of an expansion element for use in an example auxiliary doser.

FIG. 6 illustrates a cross-sectional view of the first expansion element 520. As shown in FIG. 6, the first expansion element 520 includes an inner surface 600, an outer surface 602, and an inner channel 604. The inner surface 600 of the first expansion element 520 contacts the first channel 524 of the dosing cartridge 502, and the outer surface 602 contacts the fluid received from the inlet port 506 (e.g., within the interstice 518, etc.).

The inner channel 604 defines a compressible inner volume of the first expansion element 520 and facilitates expansion and contraction of the first expansion element 520 (e.g., as temperature of the first expansion element 520 changes, etc.). The inner channel 604 may be sealed and contain a compressible medium, such as various gasses (e.g., air, noble gas, etc.). In one embodiment, the inner channel 604 is filled with foam. In an alternative embodiment, the inner channel 604 is filled with a fluid (e.g., reductant, DEF, water, oil, etc.). According to various embodiments, the inner channel 604 is triangular. However, the inner channel 604 may also be rectangular, square, trapezoidal, circular, or otherwise shaped.

In an exemplary embodiment, the first expansion element 520 is constructed from a core and a skin that encapsulates the core. The skin protects the core of the first expansion element 520 against air diffusion and diffusion of the fluid into the core the first expansion element 520 within an acceptable tolerance (e.g., a target percentage over a lifetime of the first expansion element 520, etc.).

In some applications, the first expansion element 520 includes additional channels similar to the inner channel 604. The inner channel 604 and/or any additional channels may be continuous or discontinuous within the first expansion element 520. While the first expansion element 520 is shown in FIG. 6 as having a triangular cross-sectional shape, in other applications the first expansion element 520 may have a rectangular cross-sectional shape, a square cross-sectional shape, a trapezoidal cross-sectional shape, a circular cross-sectional shape, or any other similar cross-sectional shape. The first expansion element 520 may be defined by various edges, chamfers, fillets, and other similar structural features such that the first expansion element 520 is tailored for a target application. The inner surface 600 and the outer surface 602 may be configured based on the auxiliary dosing module 204 for a target application. For example, the inner surface 600 and/or the outer surface 602 may be configured to match a contour of the housing 500 and/or the dosing cartridge 502.

Figure 7:
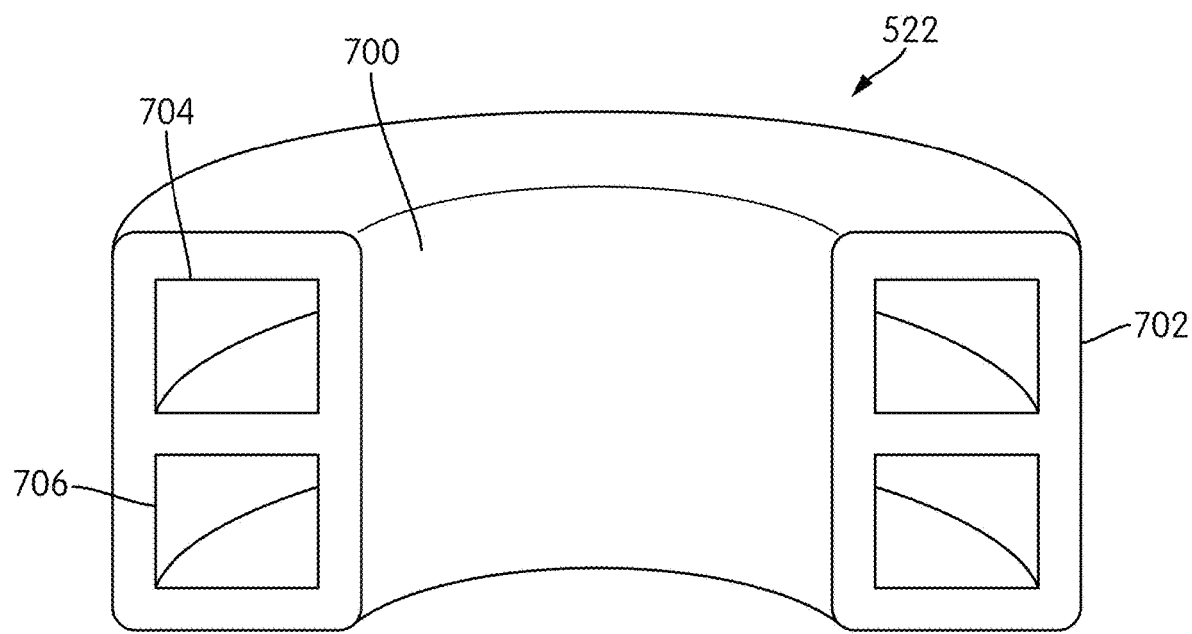
FIG. 7 is a cross-sectional view of another expansion element for use in an example auxiliary doser.

FIG. 7 illustrates a cross-sectional view of the second expansion element 522. As shown in FIG. 7, the second expansion element 522 includes an inner surface 700, an outer surface 702, a first inner channel 704, and a second inner channel 706. The inner surface 700 of the second expansion element 522 contacts the second channel 526 of the dosing cartridge 502, and the outer surface 702 contacts the fluid received from the inlet port 506 (e.g., between the dosing cartridge 502 and the housing 500, etc.).

The first inner channel 704 and/or the second inner channel 706 may be sealed and contain a compressible medium, such as various gasses (e.g., air, noble gas, etc.). In one embodiment, the first inner channel 704 and/or the second inner channel 706 is filled with foam. In an alternative embodiment, the first inner channel 704 and/or the second inner channel 706 is filled with a fluid (e.g., reductant, DEF, water, oil, etc.). The first inner channel 704 and the second inner channel 706 each define a compressible inner volume of the second expansion element 522 and cooperate to facilitate expansion and contraction of the second expansion element 522 (e.g., as temperature of the second expansion element 522 changes, etc.). According to various embodiments, the first inner channel 704 and the second inner channel 706 are rectangular or square. However, the first inner channel 704 and the second inner channel 706 may also be triangular, trapezoidal, circular, or otherwise shaped.

In an exemplary embodiment, the second expansion element 522 is constructed from a core and a skin that encapsulates the core. The skin protects the core of the second expansion element 522 against air diffusion and diffusion of the fluid into the core the second expansion element 522, within an acceptable tolerance (e.g., a target percentage over a lifetime of the second expansion element 522, etc.).

In some applications, the second expansion element 522 includes additional channels similar to the first inner channel 704 and/or the second inner channel 706. The first inner channel 704, the second inner channel 706, and/or any additional channels may be continuous or discontinuous within the second expansion element 522. While the second expansion element 522 is shown in FIG. 7 as having a rectangular cross-sectional shape, in other applications the second expansion element 522 may have a triangular cross-sectional shape, a square cross-sectional shape, a trapezoidal cross-sectional shape, a circular cross-sectional shape, or any other similar cross-sectional shape. The second expansion element 522 may be defined by various edges, chamfers, fillets, and other similar structural features such that the second expansion element 522 is tailored for a target application. The inner surface 700 and the outer surface 702 may be configured based on the auxiliary dosing module 204 for a target application. For example, the inner surface 700 and/or the outer surface 702 may be configured to match a contour of the housing 500 and/or the dosing cartridge 502.

Figure 8:
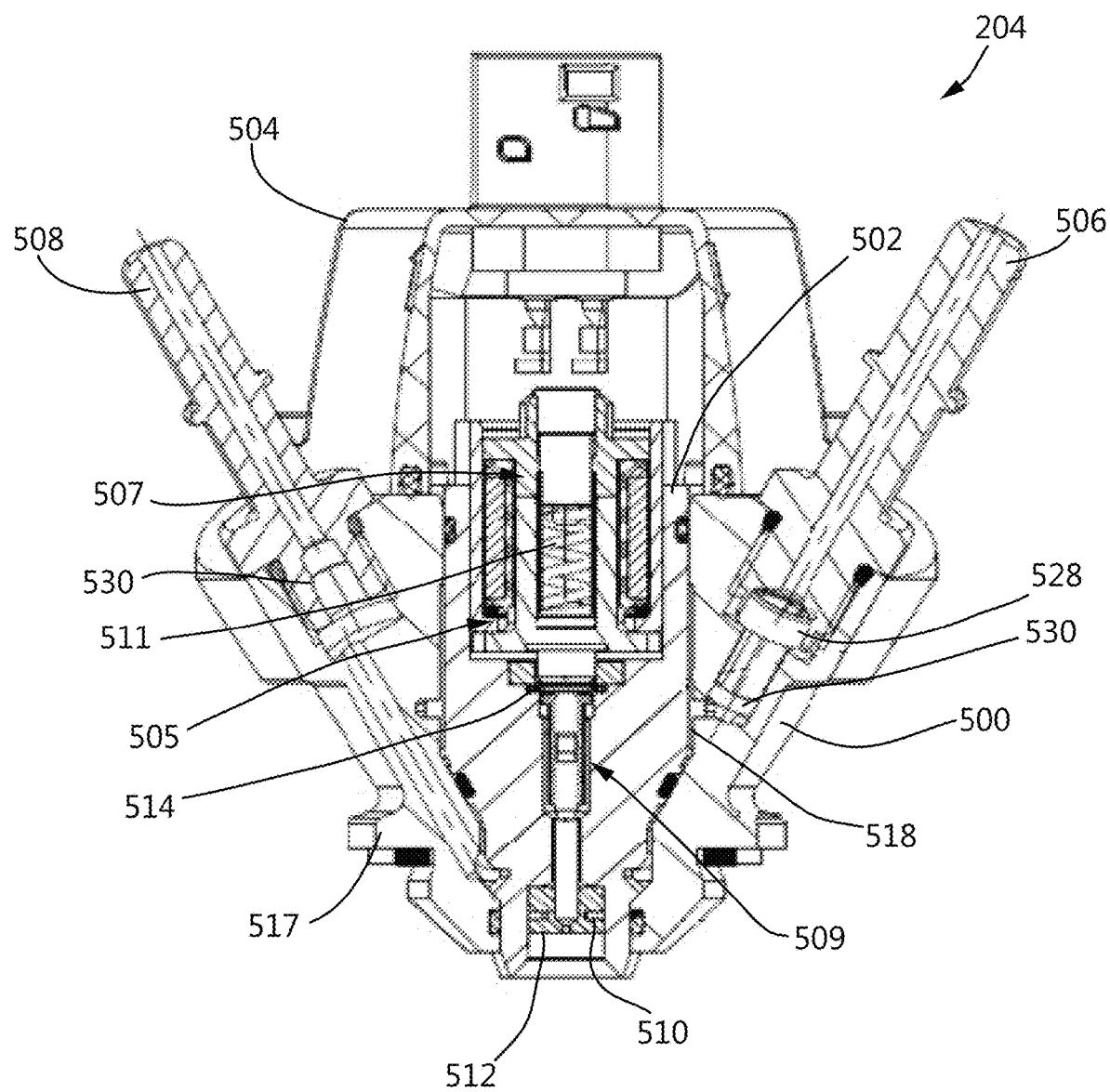
FIG. 8 is a cross-sectional view of another example auxiliary doser.
Figure 9:
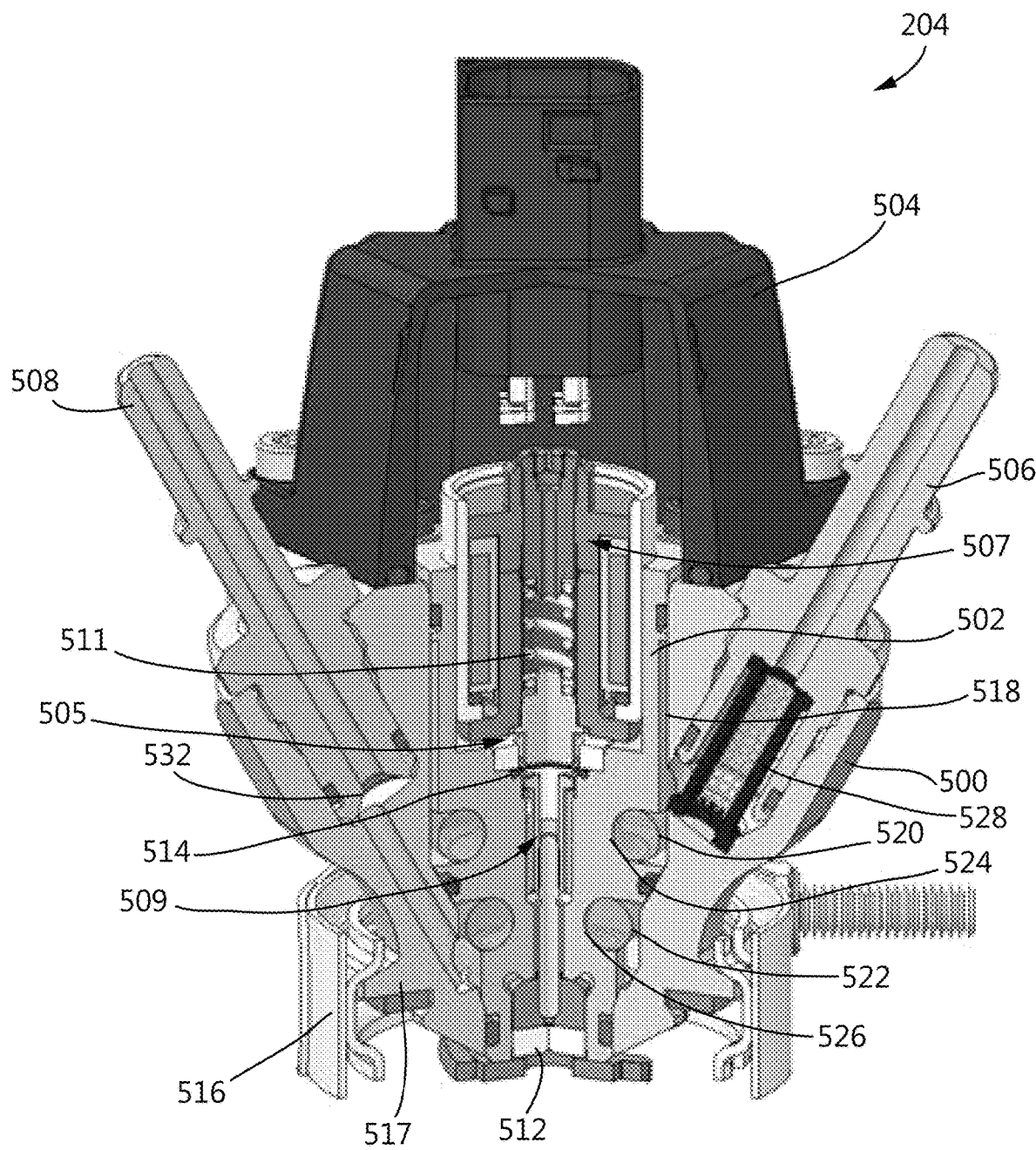
FIG. 9 is a cross-sectional view of yet another example auxiliary doser.
Figure 10:
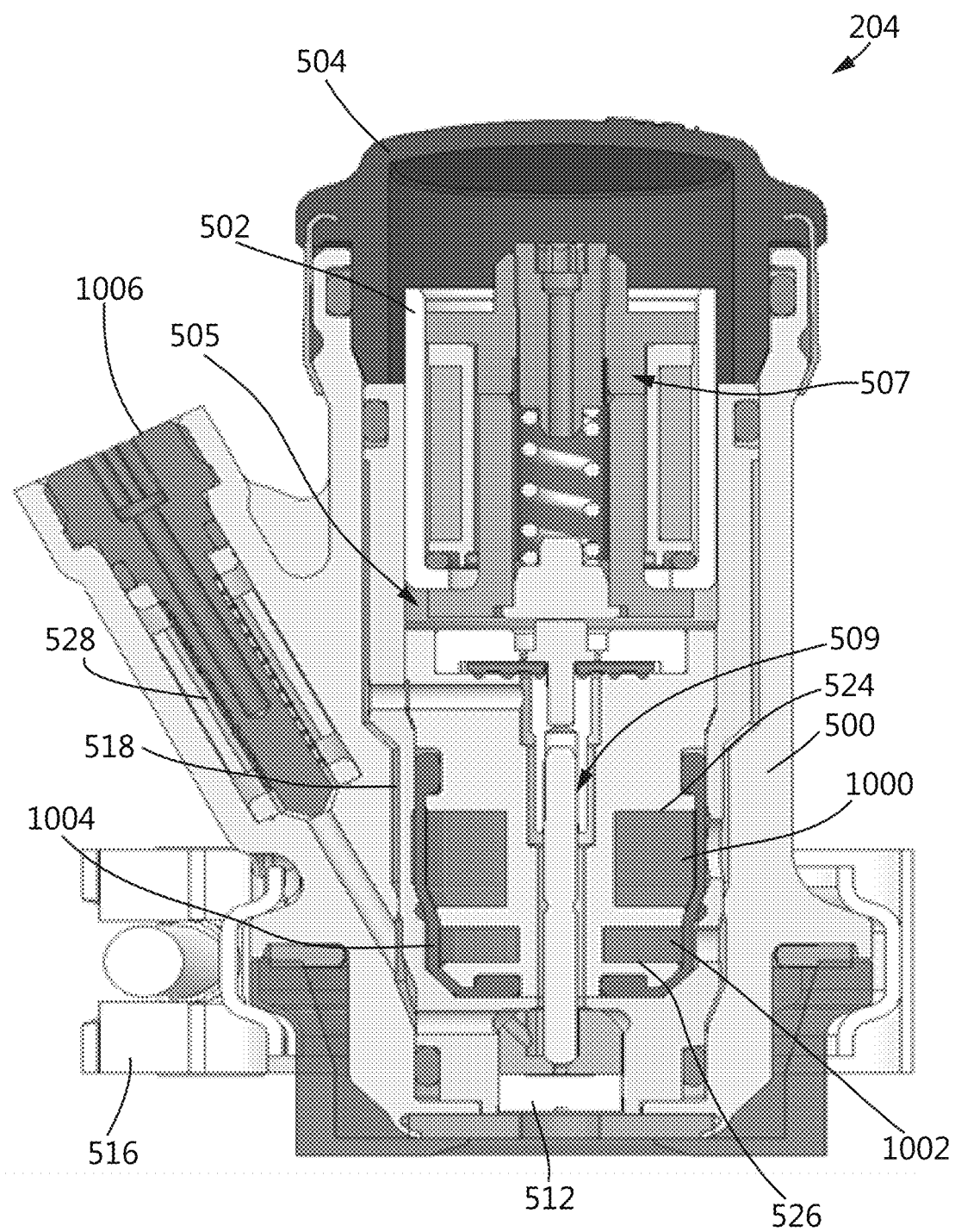
FIG. 10 is a cross-sectional view of yet another example auxiliary doser.

FIGS. 8-10 illustrate the auxiliary doser 204 according to various embodiments. For example, the auxiliary doser 204 may be variously configured and structured such that an contact area of the fluid within the auxiliary doser 204 is maximized. In this way, cooling of the auxiliary doser 204 by the fluid may be maximized. In some implementations, the auxiliary doser 204 may operate based on twelve Volt or twenty-four Volt electricity. The auxiliary doser 204 may utilize a pigtail (e.g., pigtail connectors, etc.) design. In various embodiments, the auxiliary doser 204 does not include a pressure sensor. Depending on the application, it may be desirable to calibrate the auxiliary doser 204 (e.g., via an OEM, via an ACM, etc.).

As shown in FIG. 10, the auxiliary doser 204 includes a first foam element 1000, a second foam element 1002, a separation membrane 1004, and a filter screw 1006. The first foam element 1000 and the second foam element 1002 function similarly to the first expansion element 520 and the second expansion element 522 previously described. The first foam element 1000 and the second foam element 1002 may be located between the dosing cartridge 502 and the housing 500. Specifically, the first foam element 1000 may be disposed within the first channel 524 in the housing 500 and the second foam element 1002 may be disposed within the second channel 526 in the housing 500. The separation membrane 1004 may separate the first foam element 1000 and the second foam element 1002 from the housing 500 or other component of the dosing cartridge 502. In some embodiments, the separation membrane 1004 cooperates with the dosing cartridge 502 (e.g., the first channel 524, the second channel 526, etc.) to contain the first foam element 1000 and the second foam element 1002. The filter screw 1006 is interchangeable (e.g., replaceable, etc.) and is coupled to the inlet port 506 of the auxiliary doser 204. For example, the filter screw 1006 may be removed and replaced with a new filter screw 1006 without disconnecting lines into the inlet port 506 and/or the outlet port 508 of the auxiliary dosing unit 204. The filter screw 1006 includes a pin that reduces a volume available to the fluid. In this way, the filter screw 1006 reduces freeze expansion volume. In some embodiments, the filter screw 1006 is compressible which provides compensation for fluid expansion. Through these compensation mechanisms, the filter screw 1006 may protect components of the auxiliary doser 204.

IV. Construction of Exemplary Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "in fluid communication," and the like, as used herein, mean the two components or objects have a pathway formed between the two components or objects in which a fluid, such as exhaust, water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

What is claimed is:

1. A dosing module for an aftertreatment system, the dosing module comprising:
    a housing;
    a dosing cartridge removably inserted in the housing, the dosing cartridge comprising a needle assembly;
    a cover coupled to the housing, the cover covering the dosing cartridge;
    an inlet port inserted in the housing, the inlet port configured to receive reductant and provide the reductant to the dosing cartridge; and
    a filter screw coupled to the inlet port such that the filter screw is interchangeable, the filter screw comprising a pin, the filter screw being compressible to provide compensation for fluid expansion.

2. The dosing module of claim 1, further comprising a first foam element located between the dosing cartridge and the housing, the first foam element configured to be compressed by expansion of the reductant in the housing.

3. The dosing module of claim 2, wherein:
    the dosing cartridge comprises a channel; and
    the first foam element is disposed in the channel.

4. The dosing module of claim 3, further comprising a separation membrane located between the dosing cartridge and the housing, the separation membrane cooperating with the channel to contain the first foam element.

5. The dosing module of claim 4, further comprising an outlet port inserted in the housing, the outlet port configured to receive the reductant from the dosing cartridge and provide the reductant from the dosing module.

6. The dosing module of claim 5, wherein the outlet port comprises:
    an inner end located inside the housing;
    an outer end located outside the housing and the cover; and
    a longitudinal channel extending from the inner end to the outer end.

7. The dosing module of claim 6, wherein the dosing cartridge and the housing are configured such that the reductant is capable of flowing in an interstice between the dosing cartridge and the housing.

8. The dosing module of claim 7, wherein the dosing module is configured to be controlled between an operation mode and a non-operation mode and the needle assembly is configured to selectively dose the reductant from the dosing module in the operation mode.

9. The dosing module of claim 4, further comprising:
    an outlet port inserted in the housing, the outlet port configured to receive the reductant from the dosing cartridge and provide the reductant from the dosing module;
    wherein the dosing module is configured to be controlled between an operation mode and a non-operation mode, the needle assembly is configured to selectively cause the needle assembly to dose the reductant from the dosing module in the operation mode, and the needle assembly is configured to cause the needle assembly to be closed such that the reductant is circulated in the dosing module, from the inlet port to the outlet port, causing cooling of the dosing module, in the non-operation mode.

10. An aftertreatment system, comprising:
    the dosing module of claim 1;
    an inlet exhaust section configured to receive exhaust;
    an outlet exhaust section in fluid communication with the inlet exhaust section;
    a first aftertreatment component configured to receive the exhaust from the inlet exhaust section, treat the exhaust, and provide the exhaust to the outlet exhaust section; and
    a second dosing module positioned along the outlet exhaust section, the second dosing module configured to selectively dose the exhaust with the reductant, wherein the dosing module is positioned along the inlet exhaust section and one of the dosing module and the second dosing module is configured to provide the reductant to the other of the dosing module and the second dosing module.

11. The aftertreatment system of claim 10, further comprising a first foam element located between the dosing cartridge and the housing, the first foam element configured to be compressed by expansion of the reductant in the housing.

12. The aftertreatment system of claim 11, wherein:
    the dosing cartridge comprises a channel; and
    the first foam element is disposed in the channel.

13. The aftertreatment system of claim 12, further comprising a separation membrane located between the dosing cartridge and the housing, the separation membrane cooperating with the channel to contain the first foam element.

14. An aftertreatment system, comprising:
    the dosing module of claim 1;
    an inlet exhaust section configured to receive exhaust;
    an outlet exhaust section in fluid communication with the inlet exhaust section; and
    a first aftertreatment component configured to receive the exhaust from the inlet exhaust section, treat the exhaust, and provide the exhaust to the outlet exhaust section;
    wherein the dosing module is positioned along the inlet exhaust section.

15. The aftertreatment system of claim 14, further comprising:
    a second aftertreatment component separate from the first aftertreatment component; and
    a connecting exhaust section in fluid communication with both the inlet exhaust section and the outlet exhaust section, the connecting exhaust section configured to receive the exhaust from the first aftertreatment component and provide the exhaust to the second aftertreatment component, wherein the second aftertreatment component is configured to receive the exhaust from the connecting exhaust section, treat the exhaust and provide the exhaust to the outlet exhaust section.

16. The aftertreatment system of claim 15, further comprising a second dosing module positioned along the connecting exhaust section, the second dosing module configured to selectively dose the exhaust with the reductant.

17. The aftertreatment system of claim 16, further comprising:
    a reductant source configured to store the reductant;
    a fluid circuit in fluid communication with the reductant source and the dosing module; and
    a supply unit configured to selectively draw the reductant from the reductant source and provide the reductant to the dosing module, wherein the needle assembly is configured to be closed such that the reductant is circulated in the dosing module, from the inlet port, causing cooling of the dosing module.

18. The aftertreatment system of claim 17, further comprising:
   a first foam element located between the dosing cartridge and the housing, the first foam element configured to be compressed by expansion of the reductant in the housing;
   wherein the dosing cartridge comprises a channel; and
   wherein the first foam element is disposed in the channel.

19. The aftertreatment system of claim 18, further comprising a separation membrane located between the dosing cartridge and the housing, the separation membrane cooperating with the channel to contain the first foam element.

* * * * *